United States Patent
Kremer et al.

(10) Patent No.: US 6,189,669 B1
(45) Date of Patent: Feb. 20, 2001

(54) MULTI-DISK FRICTION DEVICE HAVING FORCED LUBRICATION ON DEMAND

(75) Inventors: John M. Kremer, Sterling Hts.; Paul T. McCrary, Belleville; R. Keith Martin, Imlay City, all of MI (US)

(73) Assignee: BorgWarner Inc., Troy, MI (US)

( * ) Notice: Under 35 U.S.C. 154(b), the term of this patent shall be extended for 0 days.

(21) Appl. No.: 09/379,406

(22) Filed: Aug. 24, 1999

(51) Int. Cl.[7] .................. F16D 13/72; F16D 25/0638
(52) U.S. Cl. .................. 192/70.12; 192/85 AA; 192/113.35; 188/71.6; 188/264 E
(58) Field of Search .............. 192/70.12, 85 AA, 192/113.34, 113.35, 113.36; 188/71.6, 264 E

(56) References Cited

U.S. PATENT DOCUMENTS

| | | | | |
|---|---|---|---|---|
| 3,292,758 | * | 12/1966 | Polak | 192/113.35 |
| 3,913,616 | * | 10/1975 | Horsch | 192/113.35 X |
| 4,004,670 | * | 1/1977 | Nerstad et al. | 192/113.35 X |
| 4,270,647 | * | 6/1981 | Leber | 192/113.35 |

* cited by examiner

Primary Examiner—Richard M. Lorence
(74) Attorney, Agent, or Firm—Reising, Ethington, Barnes, Kisselle et al.; Greg Dziegielewski

(57) ABSTRACT

A friction device includes a clutch pack operable to connect and disconnect drive and driven members for transferring and interrupting torque therebetween. A piston is supported in the clutch housing and defines a first expandable chamber. The piston is responsive to the pressure of fluid in the expandable chamber to move between disengaged and engaged positions thereby actuating the clutch pack. An outer ring is slidably supported within the housing to form a second expandable chamber. The outer ring includes at least one orifice extending therethrough. The piston closes the orifice in the outer ring when the drive and driven members are disconnected and has a second position where the orifice is open. A second source of lubricant pressure separate from the piston actuating fluid flows into the second expandable chamber thence through the orifice and from the outer diameter of the clutch pack between the adjacent plates and disks to the inner diameter of the clutch pack for cooling the pack.

10 Claims, 2 Drawing Sheets

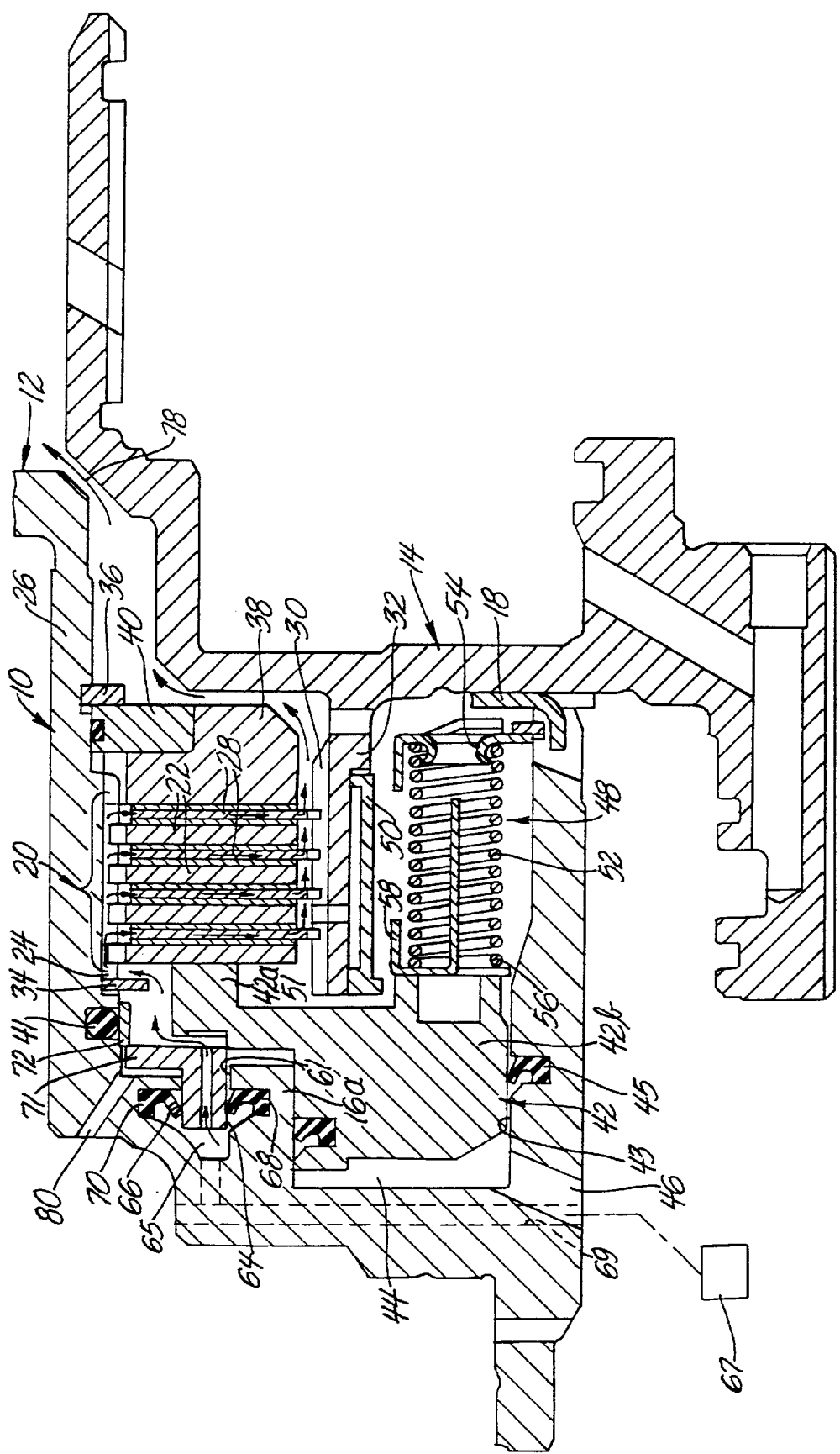

MULTI-DISK FRICTION DEVICE HAVING FORCED LUBRICATION ON DEMAND

FIELD OF THE INVENTION

The present invention relates, generally, to friction devices such as clutch or brake assemblies for use in transmissions, differentials or brake systems. More specifically, the present invention relate to a multi-disk friction clutch or brake system having selectively actuated lubrication for cooling the clutch on demand.

DESCRIPTION OF THE RELATED ART

Multi-disk friction devices are employed in a wide range of applications as clutches or brakes. For example, such friction devices are frequently used in land-based vehicles. Generally speaking, land vehicles require three basic components. These components include a power plant (such as an internal combustion engine), a powertrain and wheels. The powertrain's main component is typically referred to as the "transmission." Engine torque and speed are converted in the transmission in accordance with the tractive-power demand of the vehicle. Transmissions include one or more gear sets, which may include an inner sun gear, intermediate planet gears that are supported by their carriers and outer ring gears. Various components of the gear sets are held or powered to change the gear ratios in the transmission. The multi-disk pack clutch is a friction device, which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks, which are interleaved between one another. The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

The confronting faces of the interleaved plates and friction disks are covered with frictional surfaces. When a friction device is engaged, kinetic energy is converted into thermal energy and a considerable amount of heat is generated. If the frictional surfaces get too hot, they can burn which damages the friction surfaces and degrades the clutch or brake operational effectiveness. Accordingly, the heat generated when a friction device is engaged must be dissipated.

Multi-disk friction clutches and brake systems have traditionally relied on a continuous "splash" supply of coolant, typically automatic transmission fluid (AFT), to remove the heat generated during operation. Coolant is supplied at or near the inner diameter of the disks and moves radially outward across the friction surface under the influence of centrifugal forces. While the centrifugal forces are important to move the coolant between the engaged friction disks, because the perimeter of the plates is larger at the outer diameter than the inner diameter, the coolant tends to break up into droplets which reduces wetting of the friction surfaces and concomitantly reduces the cooling capacity of the fluid.

When the disks are not engaged, little or no cooling is usually required. However, which conventional cooling schemes employed in the related art, unneeded coolant is often supplied to the open clutch or brake. When this occurs, the coolant in the friction device is sheared by the interleaved plates and friction disks due to the differential rotational speeds of the drive and driven members which the clutch or brake bridges. This condition reduces the efficiency of the transmission through viscous shear losses in the fluid and ultimately results in lower fuel efficiency.

Additionally, when coolant is directed toward a friction device operating in an open pack mode wherein coolant is not needed, the coolant is not being used by friction devices, which are engaged or otherwise require cooling. This also increases the volume of oil needed for a given transmission, differential or brake system and unnecessarily requires increasing the capacity of the associated pump.

It is known in the related art to selectively provide coolant to the clutch pack when the friction device has been engaged and to selectively interrupt coolant to the clutch pack when the friction device is disengaged. However, in general, the systems that have been proposed in the related art suffer from the disadvantage that they are overly complex in operation or are too difficult to be manufactured in a cost-effective manner. Examples of such arrangements are set-forth in U.S. Pat. Nos. 5,755,314; 5,791,447; 5,810,412 and 5,813,508.

Accordingly, there remains a need in the art for a friction device which may be selectively cooled on demand using forced coolant flow such as when the clutch or brake is engaged and wherein coolant to the clutch or brake may be selectively interrupted when not needed, such as when the clutch or brake is disengaged. Additionally, there is a need in the art for such a friction device having a cooling scheme wherein the friction disk are fully wetted when they are engaged.

In copending U.S. application Ser. No. 09/153,582, commonly assigned a clutch pack is interposed between the drive and driven members and is operable to connect and disconnect the drive and driven members for transferring and interrupting torque therebetween. A piston assembly is supported in the clutch housing and defines an expandable chamber between the piston assembly and the clutch housing. A source of pressurized fluid is in communication with the expandable chamber. The piston assembly is responsive to the pressure of fluid in the expandable chamber to move between disengaged and engaged positions thereby actuating the clutch pack to connect and disconnect the drive and driven members.

The piston assembly includes a main body having an outer ring annularly disposed about the main body. The outer ring includes at least one orifice extending through the outer ring. The outer ring is movable between a first position wherein the orifice is closed and the drive and driven members are disconnected and a second position wherein the orifice is open to allow flow of pressurized fluid through the orifice and into contact with the clutch pack thereby cooling the clutch pack when the drive and driven members are operatively connected through the clutch pack.

Thus, the piston assembly is operable to control the flow of coolant under pressure from the outer diameter of the clutch pack between the adjacent plates and disks to the inner diameter of the clutch pack to cool same when the drive and driven members are connected. Further, the piston assembly is also operable to stop the flow of pressurized coolant and to evacuate the clutch pack when the drive and driven members are disconnected.

In this way, the friction device provides coolant to the clutch pack when coolant is needed, such as when the clutch or brake is engaged, and interrupts coolant to the clutch pack when the coolant is needed, such as when the clutch or brake is disengaged. However, such an arrangement utilizes the piston apply fluid as the coolant fluid.

SUMMARY OF THE INVENTION

In order to isolate the piston apply function from the cooling function a separate supply of pressurized fluid is directed through a second supply line and control is by hydraulic piston motion to control flow from the separate supply of coolant to the clutch pack.

The advantages of such an arrangement is that actuation pressure for the clutch pack can be separated from coolant flow in a friction device such as a clutch or brake assembly thereby optimizing the control of clutch operation.

BRIEF DESCRIPTION OF THE DRAWINGS

Other advantages of the invention will be readily appreciated, as the same becomes better understood by reference to the following detailed description when considered in connection with the accompanying drawings, wherein:

FIG. 2 is a partial cross-sectional side view of the friction device shown in FIG. 1 wherein the clutch or brake is engaged.

DETAILED DESCRIPTION OF THE PREFERRED EMBODIMENT(S)

Figure 1:
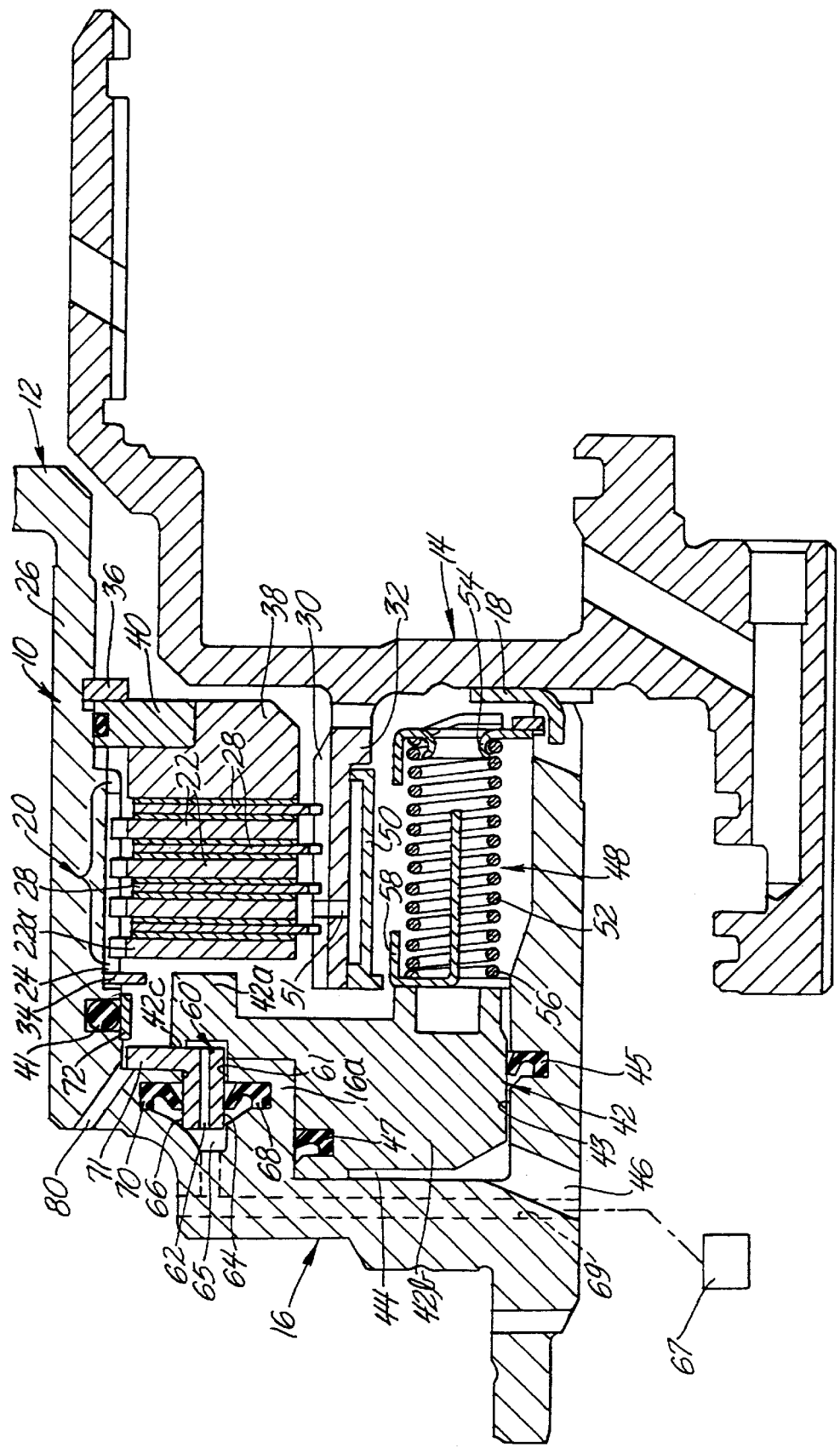
FIG. 1 is a partial cross-sectional side view illustrating the friction device of the present invention operating in an open pack mode.

Referring now to FIG. 1, a friction device such as a clutch or brake assembly of the present invention is generally indicated at 10. The friction device 10 is adapted to be employed in connection with a transmission, differential or brake system. For example only and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft, which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 includes a drive member, generally indicated at 12 and a driven member, generally indicated at 14 both of which are rotatable about a common axis 15 and which define a clutch housing, generally indicated at 16. A thrust bearing 18 is interposed between the drive and driven members 12, 14, respectively, to support axial loads which can stack up among various components in the transmission.

An annular clutch pack, one half of which is generally indicated by the bracket labeled at 20, is interposed between the drive 12 and driven 14 members and operates to connect and disconnect the drive 12 and driven 14 members for translating and interrupting torque therebetween. The clutch pack 20 includes a plurality of annular plates 22 splined at 24 to a drive hub 26. A plurality of annular friction disks 28 is splined at 30 to the driven hub 32 and interleaved between the plates 22. Together, the plates 22 and disks 28 of the annular clutch pack 20 define an outer diameter roughly at the spline 24 of the drive hub 26 and an inner diameter roughly at the splines 30 of the driven hub 32. In one disposition shown in FIG. 1, the plates 22 and friction disks 28 rotate past one another in non-contacting relationship. The plates 22 and friction disks 28 are also axially movable relative to their respective splined hubs 26, 32 to come into frictional engagement, thereby reducing or eliminating relative rotation between the plates 22 and disks 28. A pair of retaining rings 34, 36 are mounted to the drive hub 26 and are disposed on either side of the clutch pack 20. A pressure plate 38 with an O-ring gland 40 also cooperate with the retaining ring 36 to limit axial movement of the plates 22 and friction disks 28. When the disks and plates are engaged, the clutch pack 20 is sealed at its outer diameter by O-ring gland 40 and O-ring seal 41 in a hub 26.

The axial movement of the discs 22, 28 is achieved through the actuation of a piston assembly, generally indicated at 42, which is supported in a bore 43 in the clutch housing 16. The bore 43 is sealed by seal 45 located in housing 16 so as to seal against the inside diameter of piston 42 and by seal 47 carried on the piston 42 within the bore 43 to seal the outside diameter of piston 42.

The piston assembly 42 and the clutch housing 16 cooperate to define an expandable chamber 44 between the piston assembly 42 and the clutch housing 16. A source of pressurized actuation or piston apply fluid is in communication with the expandable chamber via pressure port 46. The piston assembly 42 is responsive to the pressure of fluid in the expandable chamber 44 or move between disengaged and engaged positions thereby actuating the clutch pack 20 to connect and disconnect drive and driven members 12, 14, respectively, as mentioned above.

A biasing member, generally indicated at 48, may be employed to move the piston assembly 42 to its disengaged position. This biasing member 48 is supported in the clutch housing 16 beneath a lube dam 50 located on the under side of the driven hub 32 that is provided to block flow through openings 51 provided in hubs that had prior art divergent flow patterns. Such dams can be omitted in cases where the hub is configured solely for use in convergent cooling flow systems of the present invention. As illustrated in FIGS. 1 and 2, the biasing member is a return spring assembly 48 that can have one or more coiled springs. One coiled spring 52 is shown captured within a retainer 54 with one end 56 of the spring 52 biased a retainer wall 48 held by the spring 52 against the piston assembly 42. It will be appreciated by those having ordinary skill in the art that the roles of the expandable chamber 44 and biasing member 48 may be reversed such that the biasing member 48 is employed to engage the clutch pack 20. Further, it will also be appreciated that the biasing member 48 may include any biasing mechanism conventionally known in the art and is not limited to a coiled spring.

As alluded to above, just before the clutch pack 20 is engaged by movement of a piston flange 42a against the inboard most disc 22a, the plates 22 and disks 28 come into frictional contact with one another until the relative rotational speed between the plates 22 and disks 28 become zero. In this disposition, the plates 22 and disks 28 are either rotating together at one speed or are both held against rotation, depending on the particular application in a transmission, differential or brake system. In any case, during the engagement of the plates 22 and disks 28, kinetic energy is converted to thermal energy and a considerable amount of heat is generated. This heat must be dissipated.

To this end an outer ring 60 is disposed within an annular bore 61 in an extension 16a of the clutch housing 16. The outer ring 60 includes at least one, but preferably a plurality of, orifices 62 extending through the outer ring 60 and arcuately spaced relative to one another about a common axis. The outer ring 60 is movable independent of the main body 42b of the piston assembly 42 between a first position shown in FIG. 1 wherein the orifices 62 are closed and the drive and driven members 12, 14 are disconnected and a second position shown in FIG. 2 wherein the orifices 62 are open to allow flow of pressurized coolant fluid. The outer ring 60 has inner and outer diameter surfaces shown at 64, 66, respectively. Elastomeric seals 68, 70 supported within housing 16 are disposed about the inner and outer diameters 64, 66 to slidably seal the ring 60 for movement in and out of housing bore 61 and wherein the bore 61 and ring 60 therein define an expandable chamber 65 within the housing extension 16a. The outer ring 60 includes a shoulder 71 extending radially from the outer diameter 66 that engages the clutch housing 16 to define the first position of the outer ring 60. In addition, the clutch housing 16 has a stop member 72 which cooperates with the shoulder 71 to define a second position wherein the orifices 62 are open and an exhaust port 80 in the housing 16 is closed in that it does not communicate with fluid within the clutch pack 20 since the annular should 71 and annular stop member 72 are configured to block communication to the exhaust when the outer ring is in its FIG. 2 position.

The stop member is a radially inwardly extending flange or ring 72 that covers seal 41. The annular shoulder 71 of the outer ring 60 comes into abutting relation with the stop member 72 at its second position.

The main body 42b of the piston assembly 42 has a return portion 42c which also cooperates with the radial shoulder 71 of the outer ring 60 to move the ring 60 from its second position to its first position wherein the orifices 62 are closed and the exhaust port 68 is open as shown in FIG. 1. The return portion 42c is positioned radially outward from the distal end of the main body 42b of the piston assembly 42 and extending axially toward the outer ring 60. The return portion 42c comes into abutting engagement with the outer ring 60 when the main body 42b of the piston assembly 42 is biased to its disengaged position by the biasing member 48.

The seals 68, 70 engage the ring 60 to seal the expandable chamber 65 when the orifices 62 are open for supplying a second source 67 of pressurized clutch cooling oil through a passage 69 in the housing 16. In the disposition shown in FIG. 2, the clutch housing 16 is sealed with respect to ring 60 by seals 68, 70 and the ring 60 engages ring 72 that is sealed by O-ring 41 at the outer diameter of the clutch pack 20. The piston actuation pressurized fluid fills the clutch housing 16 cavity 44 between seals 45, 47. The second source of pressure fills the outer diameter to the inner diameter of the clutch pack 20 between seals 36, 41 and is totally isolated from the piston actuation fluid. As a consequence, when coolant is required it flows without any affect on the actuation pressure. As a consequence the control of the clutch application is more controllable than in the past. More specifically, the pressurized fluid from source 67 moves from the drive hub 26 across the plates 22 and friction disks 28 against any centrifugal forces acting through the clutch pack 20 to the driven hub 32. Each of the plates 22 and friction disks 28 may include grooves to facilitate cooling of the frictional surfaces. However, the flow of coolant under pressure from the outer diameter to the inner diameter of the clutch pack ensures full wetting of the frictional surfaces and this improves the cooling efficiency of the clutch. Movement of the coolant against the direction of common centrifugal forces also ensures that the coolant will not degrade into droplets or otherwise atomize in the clutch pack 20. The pressurized fluid, typically ATF, thus cools the clutch pack 20 when the drive and driven members are operatively connected. Excess fluid may exit the clutch housing 16 via opening 76 adjacent pressure plate 40 and flows out drain 78 to an ATF sump (not shown).

The friction assembly 10 also includes at least one, but preferably a plurality of exhaust ports 80 formed in the clutch housing 16, in this case the drive hub 26. The outer ring 60 is movable to open the exhaust port 80 to direct centrifugally pressurized fluid away from the clutch pack 20 when the drive and driven members 12, 14 are disconnected (FIG. 1). In addition, the outer ring 60 is movable to close the exhaust port 80 when the drive and driven members 12, 14 are connected (FIG. 2). Thus, when the clutch pack 20 is open and relatively little heat is generated, the exhaust port 80 is open, no fluid flows through the orifices 62 in the outer rings 60 and any fluid in the housing 16 is directed through the exhaust port(s) 80 so as to eliminate or substantially reduce any viscous drag between the discs and friction plates. However, when the clutch pack 20 is engaged, the exhaust port 80 is closed by the outer ring 60.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A friction device comprising:

a drive member and a driven member which are rotatable about a common axis and which define a clutch housing therebetween;

a clutch pack interposed between said drive and driven members and operable to connect and disconnect said drive and driven members for transferring and interrupting torque therebetween;

a piston assembly supported in said clutch housing and defining a first expandable chamber between said piston assembly and said clutch housing;

a first source of pressurized fluid in communication with said first expandable chamber, said piston assembly being responsive to the pressure of fluid in said expandable chamber to move between disengaged and engaged positions thereby actuating said clutch pack to connect and disconnect said drive and driven members;

said piston assembly including a main body, a housing extension having an outer ring slidably disposed therein;

said housing extension and said outer ring forming a second expandable chamber;

a seal for sealing between said housing extension and said main body;

said outer ring including at least one orifice extending through said outer ring;

a second source of pressurized fluid in communication with said second expandable chamber for supplying fluid to said outer ring;

said outer ring being movable between a first position wherein said orifice is closed and said drive and driven members are disconnected and a second position wherein said orifice is opened by movement of said piston to allow flow of said second source of pressurized fluid through said orifice and into contact with said clutch pack thereby cooling same when said drive and driven members are operatively connected through said clutch pack.

2. A friction device as set forth in claim 1 wherein said outer ring includes a plurality of orifices extending through said outer ring and arcuately spaced relative to one another about said common axis.

3. A friction device as set forth in claim 1 wherein said housing extension has a cavity and said second pressurized fluid flows from said cavity through said at least one orifice and into contact with said clutch pack.

4. A friction device as set forth in claim 1 wherein said main body includes a peripheral support surface, said outer ring being disposed about said peripheral support surface and being axially supported between said first and second position and wherein said peripheral support surface is slidably movable relative to said outer ring after said ring has reached its second position and before said outer ring begins moving from said second position to said first position.

5. A friction device as set forth in claim 1 wherein said friction device includes at least one exhaust port, said outer ring being movable to open said exhaust port to drain pressurized fluid away from said clutch pack when said drive and driven members are disconnected and movable to close said exhaust port when said drive and driven members are connected.

6. A friction device as set forth in claim 5 wherein said clutch housing has a stop member which cooperates with said outer ring to define said second position wherein said orifice is open and said exhaust port is closed.

7. A friction device as set forth in claim 5 wherein said main body of the piston assembly has a return member which cooperates with said outer ring to move said ring from said second position to said first position wherein said at least one orifice is closed and said exhaust port is open.

8. A friction device as set forth in claim 6 wherein said stop member is a radially inwardly extending flange, said outer ring coming into abutting relation with said flange at said second position.

9. A friction device as set forth in claim 7 wherein said return member is a flange disposed radially outward from said peripheral support surface of said main body of said piston assembly, said flange coming into abutting engagement with said outer ring to close said orifice and to move said outer ring from said second position to said first position.

10. A friction device as set forth in claim 1 wherein said outer ring has a radially extending outer shoulder which engages said clutch housing to define said first position of said outer ring.

* * * * *